(12) United States Patent
Sapozhnikov et al.

(10) Patent No.: US 9,190,082 B2
(45) Date of Patent: Nov. 17, 2015

(54) DUAL READER STRUCTURE

(71) Applicant: Seagate Technology LLC, Cupertino, CA (US)

(72) Inventors: Victor Boris Sapozhnikov, Minnetonka, MN (US); Mohammed Sharia Ullah Patwari, Eden Prairie, MN (US)

(73) Assignee: SEAGATE TECHNOLOGY, LLC, Cupertino, CA (US)

( * ) Notice: Subject to any disclaimer, the term of this patent is extended or adjusted under 35 U.S.C. 154(b) by 0 days.

(21) Appl. No.: 14/012,819

(22) Filed: Aug. 28, 2013

(65) Prior Publication Data

US 2015/0062755 A1     Mar. 5, 2015

(51) Int. Cl.
*G11B 5/39* (2006.01)

(52) U.S. Cl.
CPC ................... *G11B 5/3951* (2013.01)

(58) Field of Classification Search
CPC ............ G11B 5/3954; G11B 2005/3996; G11B 5/3945; G11B 5/3948; G11B 5/3951
USPC .................. 360/319, 121, 314–316
See application file for complete search history.

(56) References Cited

U.S. PATENT DOCUMENTS

| | | | |
|---|---|---|---|
| 4,179,720 A * | 12/1979 | Miura | 360/315 |
| 5,323,285 A | 6/1994 | Smith | |
| 6,597,546 B2 | 7/2003 | Gill | |
| 6,636,389 B2 | 10/2003 | Gill | |
| 6,643,103 B1 | 11/2003 | Trindade | |
| 6,680,827 B2 * | 1/2004 | Li et al. | 360/314 |
| 6,801,411 B1 | 10/2004 | Lederman et al. | |
| 6,819,530 B2 | 11/2004 | Gill | |
| 6,828,785 B2 * | 12/2004 | Hosomi et al. | 324/252 |
| 7,324,303 B2 * | 1/2008 | Ozue et al. | 360/121 |
| 7,436,632 B2 * | 10/2008 | Li et al. | 360/315 |
| 7,551,393 B2 * | 6/2009 | Biskeborn et al. | 360/121 |
| 7,606,007 B2 | 10/2009 | Gill | |
| 7,630,176 B2 | 12/2009 | Horng et al. | |
| 7,656,610 B1 * | 2/2010 | Campos et al. | 360/121 |
| 7,751,148 B1 * | 7/2010 | Alstrin et al. | 360/241.1 |
| 8,437,106 B2 * | 5/2013 | Yanagisawa et al. | 360/319 |
| 8,462,467 B2 * | 6/2013 | Yanagisawa et al. | 360/319 |
| 8,531,801 B1 * | 9/2013 | Xiao et al. | 360/319 |
| 8,576,518 B1 * | 11/2013 | Zeltser et al. | 360/319 |
| 8,630,069 B1 * | 1/2014 | Okawa et al. | 360/319 |
| 8,638,530 B1 * | 1/2014 | Hsu et al. | 360/319 |
| 8,749,926 B1 * | 6/2014 | Le et al. | 360/324.12 |
| 8,760,820 B1 * | 6/2014 | McKinlay et al. | 360/319 |
| 8,780,505 B1 * | 7/2014 | Xiao | 360/319 |
| 8,780,506 B1 * | 7/2014 | Maat et al. | 360/319 |
| 8,797,692 B1 * | 8/2014 | Guo et al. | 360/319 |

(Continued)

FOREIGN PATENT DOCUMENTS

| | | |
|---|---|---|
| KR | 10-1998-0024100 | 7/1998 |
| KR | 10-2000-0076834 | 12/2000 |
| KR | 10-2001-0075690 | 8/2001 |

OTHER PUBLICATIONS

"Magnetoresistance Ratio and Resistance Area Design of CPP-MR Film for 2-5 Tb/in$^2$ Read Sensors," *IEEE Transactions on Magnetics*, vol. 46, No. 6, Jun. 2010; pp. 2086-2089 by Masayuki Takagishi et al.

*Primary Examiner* — Will J Klimowicz
(74) *Attorney, Agent, or Firm* — HolzerIPLaw, PC

(57) ABSTRACT

Implementations described and claimed herein provide a dual reader wherein a bottom shield is attached to side shields.

19 Claims, 4 Drawing Sheets

(56) References Cited

U.S. PATENT DOCUMENTS

| | | |
|---|---|---|
| 2002/0067580 A1 | 6/2002 | Li et al. |
| 2004/0114280 A1* | 6/2004 | Yoshikawa et al. ........... 360/314 |
| 2005/0068683 A1 | 3/2005 | Gill |
| 2005/0068684 A1 | 3/2005 | Gill |
| 2006/0002032 A1* | 1/2006 | Li et al. ......................... 360/315 |
| 2009/0201612 A1* | 8/2009 | Shimazawa et al. .......... 360/245 |
| 2009/0279213 A1 | 11/2009 | Wu et al. |
| 2012/0087045 A1* | 4/2012 | Yanagisawa et al. ......... 360/294 |
| 2012/0087046 A1* | 4/2012 | Yanagisawa et al. ......... 360/294 |

* cited by examiner

DUAL READER STRUCTURE

BACKGROUND

In a magnetic data storage and retrieval system, a magnetic read/write head typically includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary to recover the information encoded on the disc.

SUMMARY

Implementations described and claimed herein provide a dual reader wherein a bottom shield is attached to a side shield.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTION OF THE DRAWINGS

The described technology is best understood from the following Detailed Description describing various implementations read in connection with the accompanying drawings.

DETAILED DESCRIPTIONS

Figure 1:
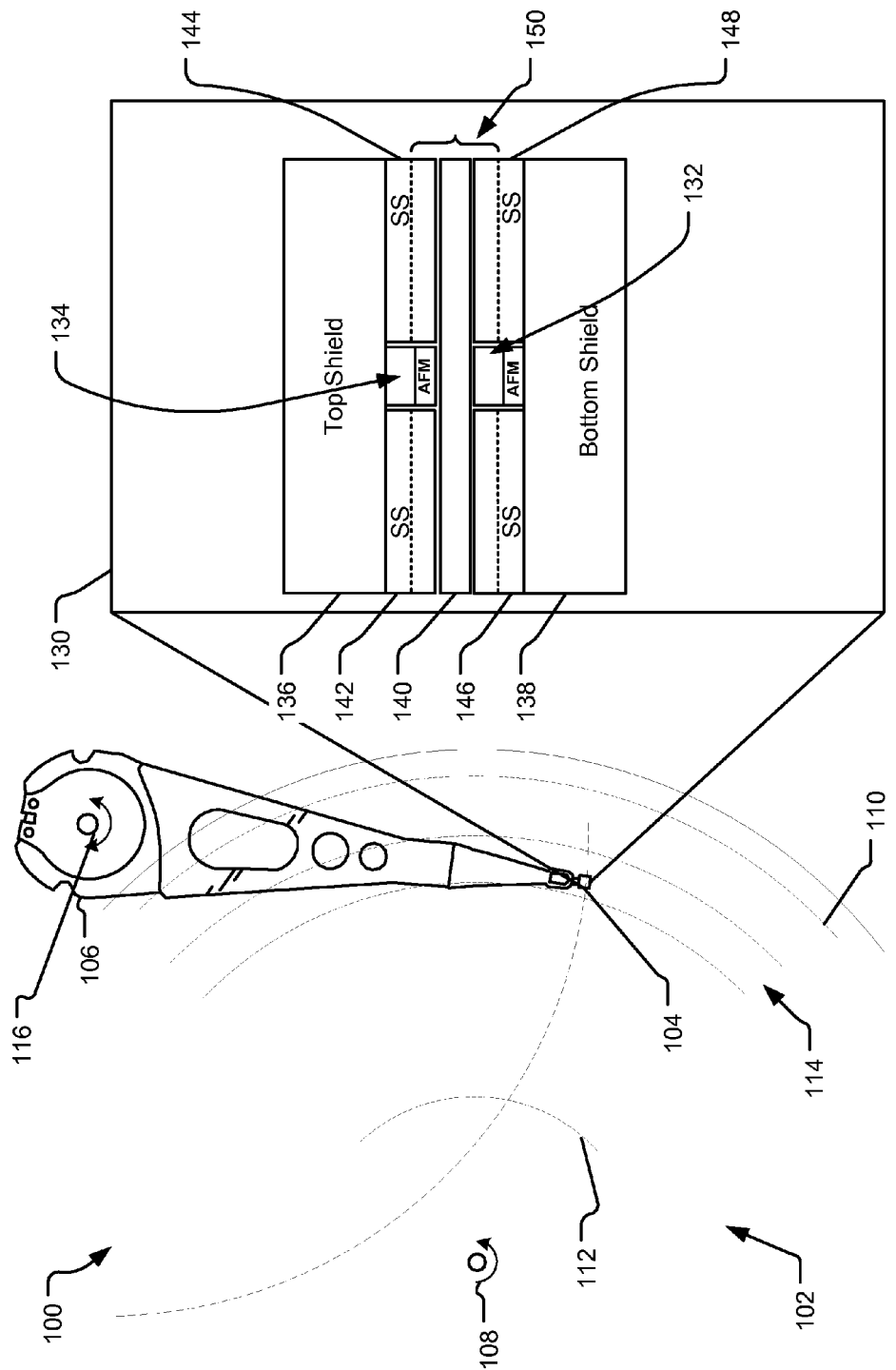
FIG. 1 illustrates an example block diagram illustrating an example read sensor structure implemented on an end of an actuator assembly.

In a magnetic data storage and retrieval system, a magnetic recording head typically includes a reader portion having a magnetoresistive (MR) sensor for retrieving magnetically encoded information stored on a magnetic disc. Magnetic flux from the surface of the disc causes rotation of the magnetization vector of a sensing layer or layers of the MR sensor, which in turn causes a change in electrical resistivity of the MR sensor. The sensing layers are often called "free" layers, since the magnetization vectors of the sensing layers are free to rotate in response to external magnetic flux. The change in resistivity of the MR sensor can be detected by passing a current through the MR sensor and measuring a voltage across the MR sensor. External circuitry then converts the voltage information into an appropriate format and manipulates that information as necessary to recover the information encoded on the disc.

MR sensors have been developed that can be characterized in three general categories: (1) anisotropic magnetoresistive (AMR) sensors, (2) giant magnetoresistive (GMR) sensors, including spin valve sensors and multilayer GMR sensors, and (3) tunneling giant magnetoresistive (TGMR) sensors.

Tunneling GMR (TGMR) sensors have a series of alternating magnetic and non-magnetic layers similar to GMR sensors, except that the magnetic layers of the sensor are separated by an insulating film thin enough to allow electron tunneling between the magnetic layers. The resistance of the TGMR sensor depends on the relative orientations of the magnetization of the magnetic layers, exhibiting a minimum for a configuration in which the magnetizations of the magnetic layers are parallel and a maximum for a configuration in which the magnetizations of the magnetic layers are anti-parallel.

For all types of MR sensors, magnetization rotation occurs in response to magnetic flux from the disc. As the recording density of magnetic discs continues to increase, the width of the tracks as well as the bits on the disc must decrease. This necessitates increasingly smaller MR sensors as well as narrower shield-to-shield spacing (SSS). The SSS of the sensors determine the signal to noise ratio (SNR) of reader with higher SSS related to lower SNR. Thus, a reduction in the SSS leads to reduction in the value of the PW50 and therefore, an increase in the value of the SNR for the recording system.

Stacked dual readers promise a significant improvement of track density capability and data rate. In a stacked dual reader, two sensor stacks are stacked between a top shield and a bottom shield along a down-track direction. The two sensor stacks are separated by a mid-shield along the down-track direction. Furthermore, the sensor stacks are positioned between side shields along cross-track direction. The distance between top shield and mid-shield determines PW50 value in top reader (top sensor stack) and the distance between the mid-shield and bottom shield determines PW50 value in the bottom reader (bottom sensor stack). Furthermore, the distance between the two sensor stacks also determines the performance of the dual stacked reader under skew, with lower distance between the two sensors resulting in better performance under skew. In one implementation of dual reader, side shields of the bottom reader are attached to the mid-shield that is made as SAF to be stable enough to support the side shields. However, in such an implementation the mid-shield has to be thick enough because thin SAF shields are stiff and therefore degrade (increase) PW50 in both top and bottom readers. This requirement of the mid-shield being thick is in direct conflict with another requirement of the mid-shield being thin to reduce dual reader performance degradation under skew.

An implementation of a stacked dual reader disclosed herein allows replacement of thick AFM mid-shield with thin solid mid-shield. Such an implementation improves PW50 due to better performance of solid mid-shield compared to an SAF mid-shield and it reduces the distance between the two sensors along the down-track direction by providing side shields that are attached to bottom shields. Such an implementation results in reduced thickness of the mid-shield separating the two sensor stacks. Specifically, an implementation disclosed herein provides a stacked dual reader with a thin solid mid-shield.

FIG. 1 illustrates an example block diagram illustrating an example read sensor structure implemented on an end of an actuator assembly 100. Specifically, FIG. 1 illustrates a plan view of an implementation of a disc 102 with a transducer head 104 situated on an end of an actuator assembly 106. Disc 102 rotates about a disc axis of rotation 108 during operation. Further, disc 102 includes an outer diameter 110 and inner diameter 112 between which are a number of data tracks 114, illustrated by circular dotted lines. Data tracks 114 are substantially circular and are made up of regularly spaced patterned bits.

Information may be written to and read from the patterned bits on the data tracks 114 through the use of the actuator assembly 106, which rotates during a data track 114 seek operation about an actuator axis of rotation 116 positioned adjacent the disc 102. The transducer head 104 mounted on the actuator assembly 106 at an end distal from the actuator axis of rotation 116 flies in close proximity above the surface of the disc 102 during disc operation. The transducer head 104 includes recording head including a read sensor for reading data from the track 114 and a write pole for writing data to the track 114.

To read data from the magnetic disk 102, transitions on the track 114 of the disk 102 creates magnetic fields. As the read sensor passes over the transitions, the magnetic fields of the transitions modulate the resistance of the read sensor. The change in the resistance of the read sensor is detected by passing a sense current through the read sensor and then measuring the change in voltage across the read sensor. The resulting resistance-based voltage signal is used to recover data encoded on the track of the disk 102.

FIG. 1 also illustrates an expanded air-bearing surface (ABS) view of a partial cross-sectional configuration of a read sensor 130 wherein the read sensor may be located on the transducer head 104. Specifically, the read sensor 130 is a stacked dual sensor including a bottom sensor stack 132 and a top sensor stack 134 located between a top shield 136 and a bottom shield 138 along down-track direction. Each of the bottom sensor stack 132 and a top sensor stack 134 are separated from each other along the down-track direction by a mid-shield 140. In one implementation, the down-track thickness of the mid-shield 140 is approximately 10 nm. Furthermore, the top sensor stack 134 is arranged between top side shields 142 and 144 whereas the bottom sensor stack 132 is arranged between bottom side shields 146 and 148.

Each of the bottom sensor stack 132 and the top sensor stack 134 are positioned on top of AFM layers. In one implementation, the distance 150 between the two stacks 132 and 134 of the read sensor 130 is approximately in the range of 20 nm. In the illustrated implementation, the bottom side shields 146 and 148 are attached to the bottom shield 138. Attaching the bottom side shields 146 and 148 to the bottom shield 138 allows detaching the bottom side shields 146 and 148 from the mid-shield 140. As a result, the mid-shield 140 may be made of a solid thin material. For example, in the illustrated implementation of the read sensor 130, the mid-shield does not include any SAF structure. Furthermore, as the mid-shield 140 is made of a solid and non SAF structure, the mid-shield 140 can be attached to the AFM of the top sensor stack 134.

Furthermore, as the mid-shield 140 is made of solid structure and it is a non-SAF mid-shield, it provides soft magnetically properties, including higher levels of permeability, which results in lower PW50 for the dual reader 130. Thus, the implementation of the read sensor 130 provides lower PW50, and higher SNR. Furthermore, the lower spacing between the top sensor 134 and the bottom sensor 132 also improves the performance of the read sensor 130 under skew. As the bottom side shields 146 and 148 are coupled to the bottom shield 138, the read sensor 130 also provides better magnetic stability to the read sensor 130.

Figure 2:
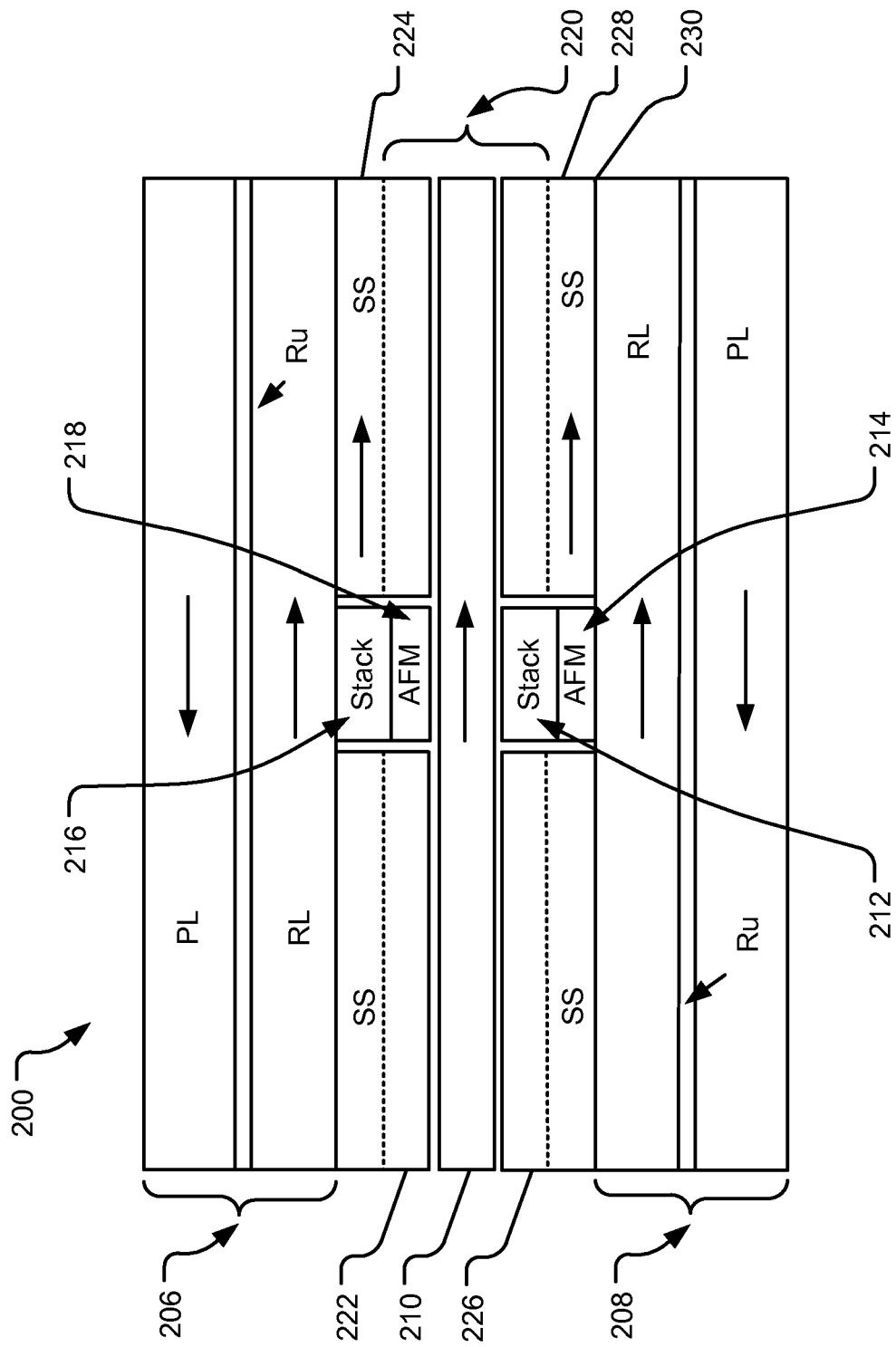
FIG. 2 illustrates an example block diagram of a stacked dual reader according to an implementation disclosed herein.

FIG. 2 illustrates an example block diagram of a stacked dual reader 200 according to an implementation disclosed herein. The stacked dual reader 200 includes a top shield 206 and a bottom shield 208 arranged on two sides of the stacked dual reader 200 along a down-track direction and separated by a mid-shield 210. A top stack 216 is arranged between the top shield 206 and the mid-shield 210, whereas a bottom stack 212 is arranged between the bottom shield 208 and the mid-shield 210. Furthermore, the top sensor stack 216 is arranged between top side shields 222 and 224 along a cross-track direction. The bottom sensor stack 212 is arranged between bottom side shields 226 and 228. The top sensor stack 216 includes a sensor stack including a free layer (FL), stack SAF and an AFM layer 218, the bottom sensor stack 212 includes a FL, stack SAF and an AFM layer 214.

Each of the top shield 206 and the bottom shield 208 may be configured in the form of a synthetic antiferromagnetic (SAF) structures. Thus, the top shield 206 includes a reference layer (RL) and a pinned layer (PL) separated by a thin layer of non-magnetic material, such as ruthenium (Ru) to provide RKKY coupling between the RL and the PL. Similarly, the bottom shield 208 also includes a reference layer (RL) and a pinned layer (PL) separated by a thin layer of non-magnetic material, such as ruthenium (Ru) to provide RKKY coupling between the RL and the PL. The direction of magnetization in the RL and PL layers of the top shield 206 and the bottom shield 208 are antiparallel to each other.

In an implementation of the stacked dual reader 200, the direction of magnetizations of the top side shields 222, 224 are parallel to the magnetization of the RL of the top shield 206. Similarly, the directions of magnetizations of the bottom side shields 226, 228 are parallel to the magnetization of the RL of the bottom shield 208.

The bottom side shields 226 and 228 are attached to the bottom shield 208 and unattached to the mid shield 210. As a result, it is possible to provide thin and solid mid-shield 210. In one implementation, the mid-shield 210 may be made of a permalloy material. For example, in one implementation, the down-track thickness of the mid-shield 210 at the ABS is approximately 10 nm. The reduction in the down-track width of the mid-shield 210 results in a reduction in the spacing between the FL of the bottom sensor stack 212 and the FL of the top sensor stack 216, which results in improved performance of the stacked dual reader 200 in presence of skew. Furthermore, the thin and magnetically soft mid-shield 210 also results in lower PW50 in top and bottom readers and thus increasing the SNR of the stacked dual reader 200. Because the bottom side shields 226 and 228 are attached to the bottom shield 208, the stacked dual reader 200 exhibits increased magnetic stability compared to other implementations of stacked dual readers where the bottom side shields are attached to the mid-shield and the tails of the side shields are unattached or dangling.

Figure 3:
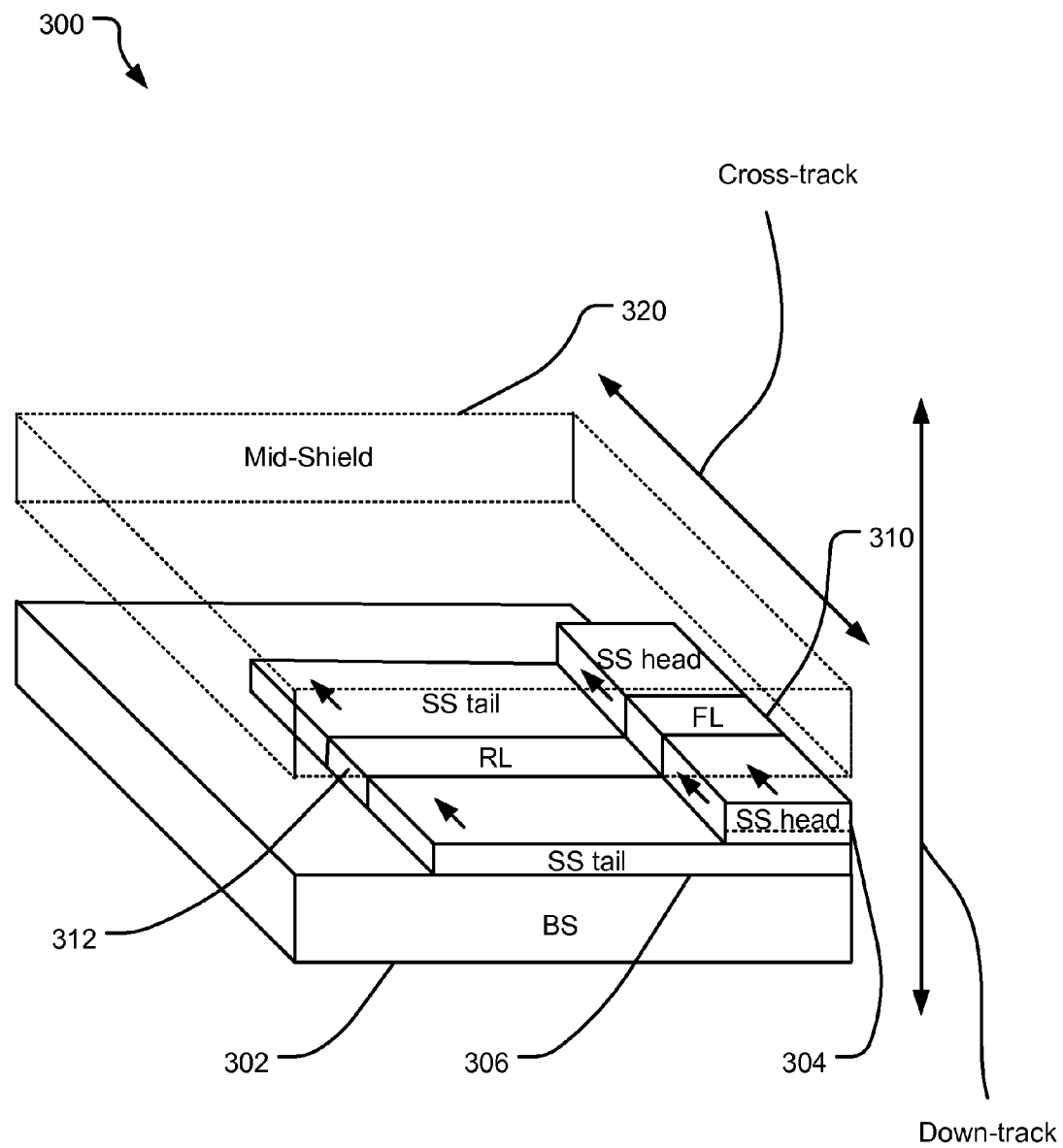
FIG. 3 illustrates a partial block diagram of a stacked dual reader according to an alternative implementation disclosed herein.

FIG. 3 illustrates a partial block diagram of a stacked dual reader 300 according to an alternative implementation disclosed herein (not shown to scale). Specifically, only a bottom part of the stacked dual reader 300 is illustrated. The stacked dual reader 300 includes a bottom shield 302, a sensor stack including a FL 310 and an RL 312, side shields including side shield head 304 and side shield tail 306, and a mid-shield 320. The sensor stack is arranged between the side shields along a cross-track direction and between the bottom shield 302 and the mid-shield 320 along a down-track direction.

In the illustrated implementation, the mid-shield 320 is made of a thin and solid structure. Furthermore, the heads 304 of the side shields are not attached to the mid-shield 320. Instead, the tails 306 of the side shields are directly attached to the bottom shield 302. Attaching the tails 306 of the side shields to the bottom shield 302 improves the stability of the stacked dual reader 300. Furthermore, the thinness of the mid-shield 320 reduces the PW50 of the stacked dual reader 300 and thus increases the SNR of the stacked dual reader 300.

Figure 4:
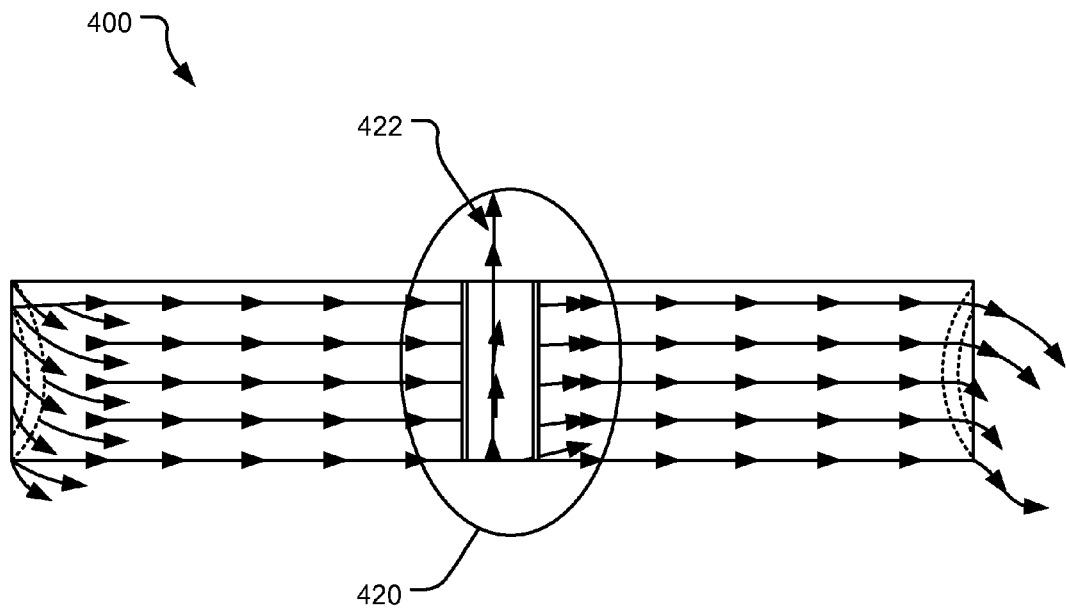
FIG. 4 illustrates example micromagnetic modeling of a stacked dual reader implementation disclosed herein

FIG. 4 illustrates example micromagnetic modeling 400 of a stacked dual reader implementation disclosed herein. Specifically, FIG. 4 illustrates a magnetization map 420 in side shield tails of a stacked dual reader where the side shield tails are directly and securely attached to a bottom shield. As a result, the side shields are magnetized substantially straight (as illustrated by the magnetization direction 422), thus providing higher magnetization bias to the FL of sensor stacks and lower asymmetry sigmas.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. An apparatus comprising:
   a dual reader including:
   a first sensor stack and a second sensor stack configured in a down-track direction and separated from each other by a mid-shield; and
   a bottom shield directly attached to a first pair of side shields and an antiferromagnetic (AFM) layer, the AFM layer located between the first pair of side-shields in a cross-track direction and adjacent to the first sensor stack.

2. The apparatus of claim 1 wherein the bottom shield is a synthetic antiferromagnetic (SAF) bottom shield.

3. The apparatus of claim 1 wherein the mid-shield does not include an AFM layer.

4. The apparatus of claim 3, wherein the side shields are not in contact with the mid-shield.

5. The apparatus of claim 3 wherein the mid-shield does not include an SAF layer.

6. The apparatus of claim 3 wherein thickness of the mid-shield in the down-track direction is approximately 10 nm.

7. The apparatus of claim 1 wherein the side shields include a side shield head in vicinity of an air-bearing surface (ABS) of the dual reader and a side shield tail that extends away from the ABS beyond the side shield head.

8. The apparatus of claim 7 wherein the side shield tail is directly coupled to the bottom shield.

9. A dual reader, comprising:
   a first sensor stack located adjacent to an antiferromagnetic (AFM) layer, the first sensor stack and AFM layer located between a first pair of side-shields in a cross-track direction, and wherein the first pair of side-shields and the AFM layer are directly attached to a bottom shield;
   a second sensor stack located between a second pair of side-shields in a cross-track direction, and configured in an up-track direction from the first sensor stack; and
   a mid-shield located between the first sensor stack and the second sensor stack in a down-track direction.

10. The dual reader of claim 9, wherein the mid-shield does not include an AFM layer.

11. The dual reader of claim 9, wherein the mid-shield does not include a SAF layer.

12. The dual reader of claim 9, wherein the first pair of side-shields is not attached to the mid-shield.

13. The dual reader of claim 9, wherein down-track thickness of the mid-shield is approximately 10 nm.

14. A storage device comprising:
   a magnetic media; and
   a dual reader including a first sensor stack and a second sensor stack configured in a down-track direction, wherein each of the first sensor stack and the second sensor stack is adjacent to an antiferromagnetic (AFM) layer, wherein the first sensor stack and the second sensor stack and each AFM layer is located between a pair of side-shields in a cross-track direction, and the dual reader is configured to read data from the magnetic media, wherein the first sensor stack and the second sensor stack are separated in the down-track direction by a mid-shield without an AFM layer, and wherein the AFM layer and the side shields located adjacent to the first sensor stack is directly attached to a bottom shield.

15. The storage device of claim 14 wherein thickness of the mid-shield in the down-track direction is approximately 10 nm.

16. The storage device of claim 14 wherein the mid-shield is made of substantially solid material.

17. The storage device of claim 14 wherein the mid-shield does not include a SAF layer.

18. The storage device of claim 14 wherein the side shields are not attached to the mid-shield.

19. The storage device of claim 14 wherein the side shields include side shield heads in the vicinity of an air-bearing surface (ABS) of the dual reader and side shield tails that extends away from the ABS beyond the side shield heads, and the side shield tails are directly coupled to the bottom shield.

* * * * *